United States Patent Office 2,909,421
Patented Oct. 20, 1959

2,909,421

COMPOSITIONS AND METHODS FOR INFLUENCING THE GROWTH OF PLANTS

Hans Gysin, Basel, and Enrico Knusli, Riehen, near Basel, Switzerland, assignors to J. R. Geigy A.-G., Basel, Switzerland, a Swiss firm No Drawing. Application August 1, 1955
Serial No. 525,819

Claims priority, application Switzerland January 14, 1955

10 Claims. (Cl. 71—2.5)

The present invention is concerned with new compositions for influencing, and more particularly, inhibiting the growth of plants and with the methods of applying these compositions for influencing the growth of plants.

The surprising observation has been made that triamino-s-triazines of the general formula:

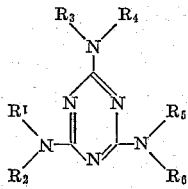

wherein $R_1$ represents a lower alkyl, lower alkenyl, lower hydroxyalkyl, aralkyl or cycloalkyl radical, and $R_2$, $R_3$, $R_4$, $R_5$ and $R_6$ each represents hydrogen or lower alkyl, lower alkenyl, lower hydroxy alkyl or cycloalkyl radical and each of the pairs of radicals $R_1$ and $R_2$, $R_3$ and $R_4$, and $R_5$ and $R_6$ together with the nitrogen atom represents a five to six membered alkylenimino radical or the morpholino radical, already in even very low concentrations have an inhibitory influence on the growth of plants or even have a lethal action. Compounds of the above general formula are obtained easily from cyanuric chloride and amines. These compounds are excellently suitable as active ingredients for weed killers, both for the killing of weeds among cultivated plants (selective herbicides) as well as for the total elimination or inhibition of undesired plant growth (overall toxic herbicides). The word "weeds" here also means undesired cultivated plants, e.g. those which have been previously planted or those which are planted in neighbouring areas. In addition, the triamino-s-triazines as defined above also exert other inhibitory influences on the plant growth and may be used for example, for defoliation, acceleration of ripeness by desiccation, e.g. of potato plants, also blossom thinning, retardation of blossoming, prolongation of the harvesting period and storing propensities. Further the term "inhibitory influences" also comprises the compensation of conditions which otherwise occasionally stimulate plant growth in an unwanted direction, e.g. high temperature or rich fertilisation, so avoiding poor yields or poor quality of the desired agricultural or horticultural product from plants which are well developed in other regards.

As active ingredients, for example, the following triamino-s-triazines can be used, the boiling point being given for the new compound:

2-amino-4,6-bis-ethylamino-s-triazine,
2-amino-4,6-bis-allylamino-s-trazine,
2,4,6-tris-ethylamino-s-triazine,
2,4,6-tris-allylamino-s-triazine,
2,4 - bis - ethylamino-6-diethylamino-s-triazine (B.P.$_{0.005}$ 109–112°),
2-ethylamino-4,6-bis-diethylamino-s-triazine, and
2,4,6-tris-diethylamino-s-triazine.

Further examples of active ingredients are:

2,4-diamino-6-ethylamino-s-triazine,
2,4-diamino-6-n-butylamino-s-triazine,
2,4-diamino-6-cyclohexylamino-s-triazine,
2,4-diamino-6-benzylamino-s-triazine,
2,4-diamino-6-diethylamino-s-triazine,
2,4-diamino-6-piperidino-s-triazine,
2-amino-4,6-bis-($\beta$-hydroxy-ethylamino)-s-triazine,
2-amino-4,6-bis-(di-$\beta$-hydroxyethyl-amino)-s-triazine,
2,4,6-tris-($\beta$-hydroxy-ethylamino)-s-triazine,
2,4,6-tris-dimethylamino-s-triazine,
2,4,6-tris-(di-$\beta$-hydroxyethyl-amino)-s-triazine, and
2,4,6-tris-morpholino-s-triazine.

The plant growth influencing compositions according to the invention are either solutions, emulsions, suspensions or dusts according to the intended use. All application forms however, must contain the active substance in fine distribution. In particular, when total destruction of plant growth, premature desiccation or defoliation are desired, the effect can be increased by the use of carriers which are phytotoxic themselves such as, e.g. high boiling minerals, oils or chloro hydrocarbons. On the other hand, the selective inhibition of plant growth, e.g. selective weed killing, may be better attained by the use of indifferent carriers.

For example, mineral oil fractions such as kerosene or diesel oil, or coal tar oil and oils of vegetable or animal origin can be used as solvents for solutions which can be sprayed direct onto the plants. The active ingredients according to this invention are added to such oils direct or with the use of suitable auxiliary solvents such as xylene. Solutions in lower boiling or also in more expensive solvents such as alcohols, e.g. ethyl or isopropyl alcohol, ketones, such as, e.g. acetone or cyclohexanone, hydrocarbons, e.g. benzene, toluene, xylene, tetrahydronaphthalene or alkylated naphthalenes and chlorinated hydrocarbons such as tetrachlorethane or ethylene chloride are less suitable for direct application but can be used for combinations with suitable emulsifiers for the production of concentrates which can be worked up for aqueous emulsions.

Aqueous application forms are made from emulsions and dispersion concentrates by adding water. The substances as such or dissolved in one of the above named solvents, are homogeneously incorporated into water, preferably by means of wetting or dispersing agents. Examples of cation active emulsifiers or dispersing agents are quaternary ammonium compounds, examples of anion active emulsifying agents are soap, soft soap, long chained aliphatic sulphuric acid monoesters, araliphatic sulphonic acids, long chained alkoxyacetic acids and examples of non-ionic emulsifiers are polyglycol ethers of fatty alcohols and polyethylene oxide condensation products. Also, concentrates can be produced consisting of active substance, emulsifier or dispersing agent and, if necessary, solvent. These latter are suitable for dilution with water.

Dusts can be produced by mixing or blending active substance with a solid carrier. Examples of such are: talcum, diatomaceous earth, kaolin, bentonite, calcium carbonate, boric acid, tricalcium phosphate or also sawdust, powdered cork, charcoal and other materials of vegetable origin. On the other hand, the carriers can be impregnated by means of a volatile solvent. Dusts and pastes can be suspended in water by the addition of wetting agents and protective colloids and so used as spraying agents.

Liquid concentrates for aqueous emulsions and wettable powders for aqueous suspensions can be prepared both from liquid and solid active compounds. However liquid active subtsances or solid active substances are more suitable for the preparation of liquid concentrates or of wettable powders of higher concentration respectively. The various forms of application can be adapted to the intended use in the usual way by the addition of substances which improve the distribution, the adhesive properties, resistance to rain, and, possibly, the resorption. Such substances are: e.g. fatty acids, resins, wetting agents, glue, casein or alginates. In the same way, the biological activity can be increased or amplified by the addition of substances which have a bactericidal or fungicidal action or of substances which also influence the growth of plants, as well as by combination with fertilisers.

In the following, examples typical application agents and application forms are given (Examples 1 to 4).

To illustrate the range of application mentioned in the description, some chosen examples of laboratory and field tests and the results obtained are also given.

*Example 1*

10 parts of 2,4,6-tris-ethylamino-diethylamino-s-triazine or of 2-ethylamino-4,6-bis-diethylamino-s-triazine and 90 parts of talcum are ground in a small mill to the greatest degree of fineness. The powder thus obtained can be used as a dust.

*Example 2*

20 parts of 2,4-bis-ethylamino-6-diethylamino-s-triazine or 20 parts of 2-ethylamino-4,6-bis-diethylamino-s-triazine are dissolved in a mixture of 48 parts of diacetone alcohol, 16 parts of xylene and 16 parts of an anhydrous high molecular condensation product of ethylene oxide with high fatty acids. This concentrate can be diluted with water to give emulsions of any concentration desired.

*Example 3*

80 parts of 2-amino-4,6-bis-diethylamino-s-triazine are mixed with 2–4 parts of a wetting agent, e.g. a sulphuric acid ester of an alkyl polyglycol ether, 1–3 parts by weight of a protective colloid, e.g. sulphite waste liquor and 15 parts of an inert solid carrier such as, e.g. kaolin, bentonite, chalk or kieselguhr. The mixture is then ground very finely in a suitable mill. The powder obtained can be added to water and gives a suspension which is very stable.

*Example 4*

10 parts of 2,4-bis-ethylamino-6-diethylamino-s-triazine are dissolved in 90 parts of trichloroethylene or in high boiling organic solvent such as coal tar oil, diesel oil, spindle oil or aromatic solvent.

*Example 5*

For each compound to be tested and for control, a seed box was prepared as follows: in one half of the box 10 seeds of wheat, of mustard, of lucerne and of carrot were sown 3 cm. deep and in the other half 10 seeds of each of the above types of plants were sown 1 cm. deep. All the seed boxes were lightly watered. They were then sprayed with 0.1 litre per sq. m. of 2% emulsions or suspensions of the compounds to be tested (according to the state of aggregation), which corresponds to 2 g. of active ingredient per sq. m.

After 21 days, the mustard and lucerne in the seed boxes treated with 2-amino-4,6-bis-diethylamino-s-triazine, 2-amino-4,6-bis-allylamino-s-triazine and 2,4,6-tris-diethylamino-s-triazine were all dead whilst the wheat and carrots remained uninjured. In the seed boxes treated with 2-ethylamino-4,6-bis-diethylamino-s-triazine and 2,4-bis-ethylamino-6-diethylamino-s-triazine, the mustard and lucerne were dead whilst the wheat was injured and the carrots grew normally.

*Example 6*

0.5% emulsions of 2,4,6-tris-ethylamino-s-triazine, 2-amino-4,6-bis-diethylamino-s-triazine, 2,4-bis-ethylamino-6-diethylamino-s-triazine and 2-ethylamino-4,6-bis-diethylamino-s-triazine sprayed on to oats and mustard plants about 10 cm. in height caused severe leaf burns. A 0.5% emulsion of 2-amino-4,6-bis-allylamino-s-triazine also caused leaf burns on mustard plants.

*Example 7*

A dust containing 10% of 2,4-bis-ethylamino-6-diethylamino-s-triazine or 10% of 2-ethylamino-4,6-bis-diethylamino-s-triazine and talcum as a carrier applied to 3–4 week old cotton plants caused severe leaf burn within 1–3 days after application.

What we claim is:

1. A method of inhibiting the growth of plants which comprises bringing into contact with at least a part of a plant in an amount sufficient to inhibit plant growth, a compound of the formula:

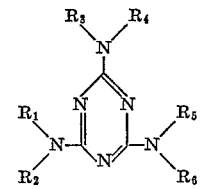

wherein $R_1$ represents a member selected from the group consisting of lower alkyl, lower alkenyl, hydroxyethyl and cyclohexyl radicals, and $R_2$, $R_3$, $R_4$, $R_5$ and $R_6$ each represents a member selected from the group consisting of hydrogen, lower alkyl, lower alkenyl, hydroxyethyl, cyclohexyl radicals, and each of the pairs of radicals $R_1$ and $R_2$, $R_3$ and $R_4$, and $R_5$ and $R_6$ together with the corresponding nitrogen atom constitutes a member selected from the group consisting of five to six-membered alkylenimino radicals and the morpholino radical.

2. A method of desiccating cultivated plants which comprises bringing into contact with at least an aerial part of the plant in an amount sufficient to cause desiccation, a compound of the formula:

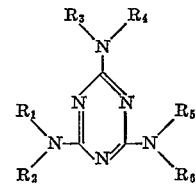

wherein $R_1$ represents a member selected from the group consisting of lower alkyl, lower alkenyl, hydroxyethyl, and cyclohexyl radicals and $R_2$, $R_3$, $R_4$, $R_5$ and $R_6$ each represents a member selected from the group consisting of hydrogen, lower alkyl, lower alkenyl, hydroxyethyl, and cyclohexyl radicals, and each of the pairs of radicals $R_1$ and $R_2$, $R_3$ and $R_4$, and $R_5$ and $R_6$ together with the corresponding nitrogen atom constitutes a member selected from the group consisting of five to six-membered alkylenimino radicals and the morpholino radical.

3. A method of inhibiting weed growth without influencing the growth of the cultivated plant which comprises bringing into contact with at least a part of the weed plant in an amount sufficient to inhibit plant growth, a compound of the formula:

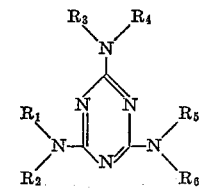

wherein $R_1$ represents a member selected from the group consisting of lower alkyl, lower alkenyl, hydroxyethyl, and cyclohexyl radicals and $R_2$, $R_3$, $R_4$, $R_5$ and $R_6$ each represents a member selected from the group consisting of hydrogen, lower alkyl, lower alkenyl, hydroxyethyl, and cyclohexyl radicals, and each of the pairs of radicals $R_1$ and $R_2$, $R_3$ and $R_4$, and $R_5$ and $R_6$ together with the corresponding nitrogen atom constitutes a member selected from the group consisting of five to six-membered alkylenimino radicals and the morpholino radical.

4. A method of eliminating plants of all kinds where no vegetation is wanted, which comprises bringing into contact with at least a part of each plant of the unwanted vegetation in an amount sufficient to stop plant growth, a compound of the formula:

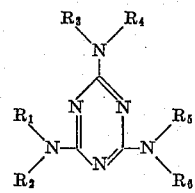

wherein $R_1$ represents a member selected from the group consisting of lower alkyl, lower alkenyl, hydroxyethyl, and cyclohexyl radicals and $R_2$, $R_3$, $R_4$, $R_5$ and $R_6$ each represents a member selected from the group consisting of hydrogen, lower alkyl, lower alkenyl, hydroxyethyl, and cyclohexyl radicals, and each of the pairs of radicals $R_1$ and $R_2$, $R_3$ and $R_4$, and $R_5$ and $R_6$ together with the corresponding nitrogen atom constitutes a member selected from the group consisting of five to six-membered alkylenimino radicals and the morpholino radical.

5. A method of inhibiting the growth of plants which comprises bringing into contact with at least a part of a plant in an amount sufficient to inhibit plant growth, 2,4,6-tris-diethylamino-s-triazine.

6. A plant growth inhibiting composition comprising 2,4,6-tris-diethylamino-s-triazine in a concentration sufficient to inhibit plant growth, with a solid powder as carrier.

7. A method of inhibiting the growth of plants which comprises bringing 2,4,6-tris-ethylamino-s-triazine into contact with at least a part of a plant in an amount sufficient to inhibit plant growth.

8. A method of inhibiting the growth of plants which comprises bringing 2-amino-4,6-bis-diethylamino-s-triazine into contact with at least a part of a plant in an amount sufficient to inhibit plant growth.

9. A plant growth inhibiting composition comprising 2,4,6-tris-ethylamino-s-triazine in a concentration sufficient to inhibit plant growth, with a solid powder as carrier.

10. A plant growth inhibiting composition comprising 2-amino-4,6-bis-diethylamino-s-triazine in a concentration sufficient to inhibit plant growth, with a solid powder as carrier.

References Cited in the file of this patent

UNITED STATES PATENTS

| | | |
|---|---|---|
| 2,388,143 | Harris | Oct. 30, 1945 |
| 2,567,847 | Kaiser | Sept. 11, 1951 |
| 2,636,816 | Stewart | Apr. 28, 1953 |
| 2,720,480 | Wolf | Oct. 11, 1955 |
| 2,749,231 | Ligett et al. | June 5, 1956 |

OTHER REFERENCES

Crocker in "Growth of Plants," Reinhold Publishing Corp., New York, 1948, page 216.

Grundmann et al. in "Journal of American Chemical Society," vol. 76, page 5646–10 (1954).